United States Patent
Baxter et al.

(10) Patent No.: US 7,139,222 B1
(45) Date of Patent: *Nov. 21, 2006

(54) SYSTEM AND METHOD FOR PROTECTING THE LOCATION OF AN ACOUSTIC EVENT DETECTOR

(76) Inventors: Kevin Baxter, 5521 Cleon Ave., North Hollywood, CA (US) 91601; Ken Fisher, 5521 Cleon Ave., North Hollywood, CA (US) 91601; Fred Holmes, 5521 Cleon Ave., North Hollywood, CA (US) 91601

( * ) Notice: Subject to any disclaimer, the term of this patent is extended or adjusted under 35 U.S.C. 154(b) by 0 days.

This patent is subject to a terminal disclaimer.

(21) Appl. No.: 10/905,795

(22) Filed: Jan. 20, 2005

Related U.S. Application Data

(60) Provisional application No. 60/481,919, filed on Jan. 20, 2004.

(51) Int. Cl.
*G01S 3/802* (2006.01)

(52) U.S. Cl. ............... 367/127; 367/124; 367/129; 367/906

(58) Field of Classification Search .......... 367/124, 367/127, 129, 906, 907
See application file for complete search history.

(56) References Cited

U.S. PATENT DOCUMENTS

| | | | | |
|---|---|---|---|---|
| 5,455,868 | A | * 10/1995 | Sergent et al. | 367/906 |
| 5,504,717 | A | * 4/1996 | Sharkey et al. | 367/124 |
| 5,973,998 | A | 10/1999 | Shown et al. | |
| H1916 | H | * 11/2000 | Hollander | 367/127 |
| 6,178,141 | B1 * | 1/2001 | Duckworth et al. | 367/127 |
| 6,847,587 | B1 * | 1/2005 | Patterson et al. | 367/127 |
| 2002/0003470 | A1 * | 1/2002 | Auerbach | 340/425.5 |
| 2003/0167139 | A1 * | 9/2003 | Swartz et al. | 702/65 |

* cited by examiner

*Primary Examiner*—Ian J. Lobo

(57) ABSTRACT

A system and method for protecting sensor positions in an array of acoustic sensors which make up a gunfire locator system. The inventive system includes a purity of sensors and a host computer. Each sensor includes: a microphone for receiving acoustic information; a processor for processing acoustic information to detect an acoustic event and determine a time of arrival; a GPS receiver; an encryption module for encrypting transmitted sensor positions; and a network interface for transmitting sensor positions and times of arrival. The host computer includes: a network interface for receiving sensor transmissions; an encryption module for deciphering sensor positions; and a CPU.

3 Claims, 3 Drawing Sheets

SYSTEM AND METHOD FOR PROTECTING THE LOCATION OF AN ACOUSTIC EVENT DETECTOR

BACKGROUND OF THE INVENTION

This application hereby claims priority back to U.S. Provisional Application Ser. No. 60/481,919, filed on Jan. 20th, 2004 entitled "SYSTEM AND METHOD FOR PROTECTING THE LOCATION OF AN ACOUSTIC EVENT DETECTOR", hereby incorporated by reference as if set forth fully herein.

The present invention relates to a system and method for detecting and locating an acoustic event. More particularly, but not by way of limitation, in a system for identifying and locating an acoustic event, the present invention provides a system and method for protecting the location of an acoustic sensor.

Gunfire and sniper detection systems are generally known in the art. Such systems can be broadly grouped into three categories: systems which pinpoint the precise location of the source of gunfire; azimuthal sensors which provide an indication of the radial direction to the source of gunfire; and proximity sensors which merely provide an indication that nearby gunfire was detected. While such systems have been demonstrated to perform well in both law enforcement and military applications, the entire field is presently an emerging technology.

In many large cities, gun-related violence has become a plague of epidemic proportions. Urban gunfire, whether crime-related or celebratory in nature, results in thousands of deaths per year in the United States alone. Gunfire location systems, such as those installed in the Redwood City, Calif., Glendale, Ariz., Willowbrook, Calif., City of Industry, Calif., and Charleston, S.C. areas, have proven to be effective in reducing law enforcement response time to detected gunfire, apprehending criminals, collecting evidence, and reducing the occurrence of celebratory gunfire. One such system is described in U.S. Pat. No. 5,973,998, issued to Showen, et al., which is incorporated herein by reference.

Showen, et al. discloses a system wherein sensors are placed at a density of roughly six to ten sensors per square mile. Audio information is sent to a computer at a central location and processed to: detect a gunshot; determine a time of arrival for the gunshot at each sensor; and calculate a location of the shooter from the differences in the times of arrival at three or more sensors. Showen, et al. takes advantage of the long propagation distance of gunfire to place sensors in a relatively sparse array so that only a few of the sensors can detect the gunfire. This permits the processor to ignore impulsive events which only reach one sensor—a concept called "spatial filtering". This concept of spatial filtering radically reduces the sensor density compared to predecessor systems, which require as many as 80 sensors per square mile.

Another gunshot location system is described in co-pending U.S. patent application Ser. No. 10/248,511 by Patterson, et al., filed Jan. 24, 2003, which is incorporated herein by reference. Patterson, et al., discloses a system wherein audio information is processed within each sensor to detect a gunshot and determine a time of arrival at the sensor. Time of arrival information, as determined from a synchronized clock, is then transmitted wirelessly by each sensor to a computer at a centralized location where a location of the shooter is calculated in the same manner as in the Showen, et al. system.

As yet, azimuthal systems have not been as widely accepted as, for example, the Showen, et al. system. Azimuthal sensors typically employ one or more closely-spaced sensors, where each sensor includes several microphones arranged in a small geometric array. A radial direction can be determined by measuring the differences in arrival times at the various microphones at a particular sensor. Presently such systems suffer from somewhat limited accuracy in the determination of the radial angle, which in turn, translates into significant errors in the positional accuracy when a location is found by finding the intersection of two or more radial lines, from corresponding sensors, directed toward the shooter. Since errors in the radial angle result in ever increasing positional error as the distance from the sensor to the source increases, the reported position will be especially suspect toward the outer limits of the sensors' range.

To provide an absolute location for an event, the locations of reporting sensors must be known. In a fixed system, the location of each sensor can be surveyed at the time the sensors are placed. In a system with moving or re-locatable sensors, each sensor typically self-surveys with a global positioning system receiver ("GPS") or other such system. Either periodically or at the time of an event, the sensor typically reports its position to a server.

One application that is foreseen for gunshot location systems is in military applications, typically utilizing a combination of fixed sensors, soldier-worn sensors, and vehicle mounted sensors. Information about the source location of a gunshot would be supplied to individual soldiers to provide sighting information for return fire or so the soldier may find effective cover. Soldier-worn or vehicle mounted sensors employ, by necessity, wireless communication. As will be appreciated by those skilled in the art, enemy eavesdropping on communications of the gunshot detection system could be disastrous since the enemy would know its position had been compromised and, worse yet, the enemy would be supplied the location of individual soldiers and/or vehicles.

It is thus an object of the present invention to provide a system and method for securing the location information from acoustic sensors in a gunshot detection system during transmission from, or to each sensor.

SUMMARY OF THE INVENTION

The present invention provides a system and method for protecting the location of an acoustic sensor in a gunshot detection system. In a preferred embodiment, the inventive system includes: a plurality of acoustic sensors dispersed throughout a monitored area, each sensor having a GPS receiver; a host processor which receives, among other things, sensor location and time of arrival of detected events from the sensors; a wireless communication network adapted to deliver information from the sensors to a host processor. At least positional data transmitted between various components of the system is encrypted to eliminate the possibility of the reception of soldier or vehicle positions by an enemy force.

In another preferred embodiment the period between administrative transmissions among components of the system are randomized and minimized in duration to prevent the use of direction finding techniques to locate soldiers or vehicles which are equipped with the acoustic sensors.

Further objects, features, and advantages of the present invention will be apparent to those skilled in the art upon examining the accompanying drawings and upon reading the following description of the preferred embodiments.

DESCRIPTION OF THE PREFERRED EMBODIMENTS

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figure 1:
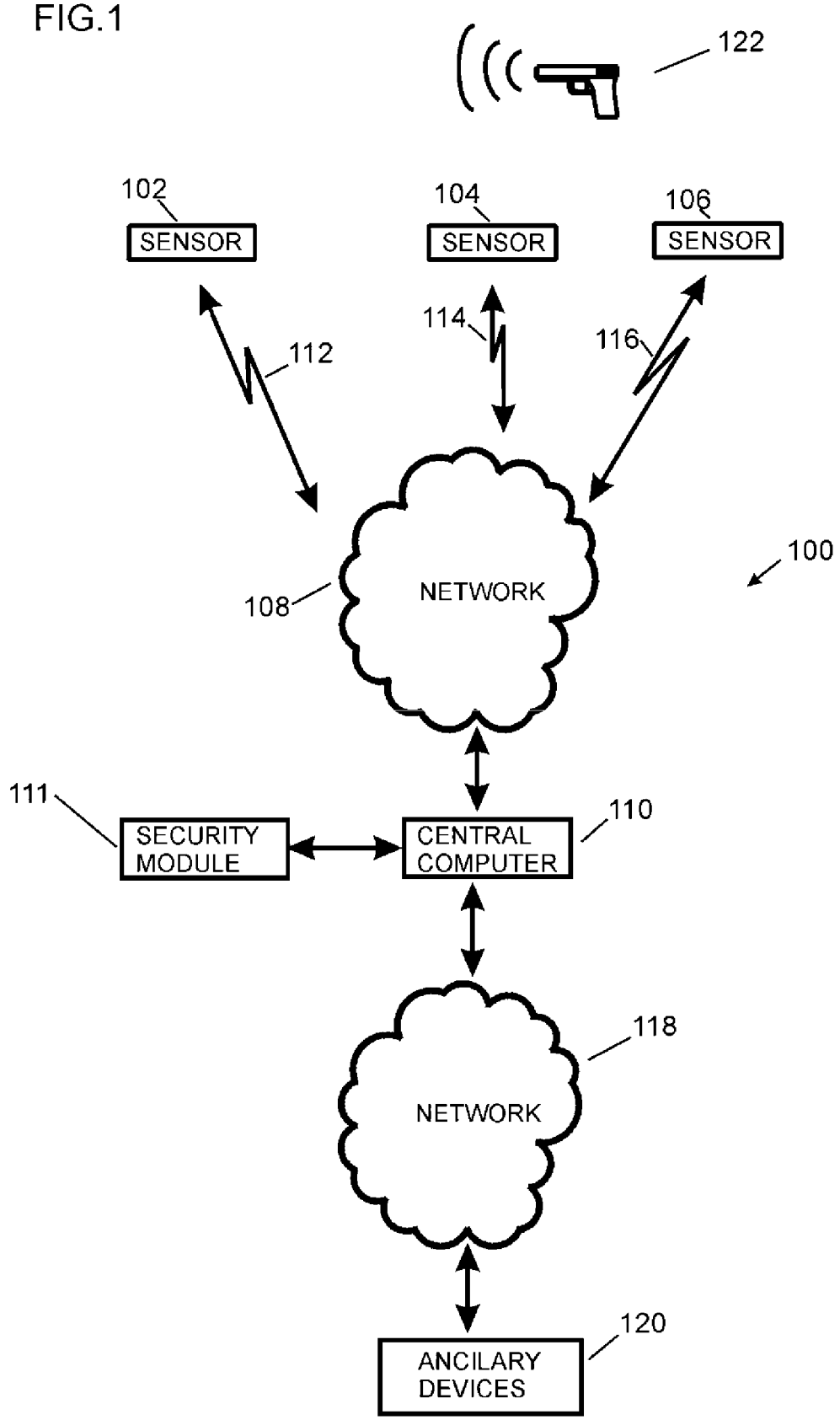
FIG. 1 depicts a preferred configuration of the inventive gunshot detection system.

Referring now to the drawings, wherein like reference numerals indicate the same parts throughout the several views, a representative gunshot detection system 100 is shown in its general environment in FIG. 1. In a preferred embodiment, a plurality of sensors 102–106 are dispersed over a monitored area. In a fixed installation, preferably each sensor is placed such that it has a relatively unobstructed acoustic view around its immediate area. By way of example and not limitation, suitable sites include: placed atop a building; placed atop utility or light poles; on towers, etc. Alternatively, sensor 102–106 may be attached to an article of clothing and worn by an officer or soldier, or mounted on a vehicle. Typically sensors 102–106 communicate through a communication network 108 with a centralized processor 110 wherein information concerning acoustic events is processed to provide details of the event, such as the source location of a gunshot, time of the gunshot, the number of detected gunshots, the type of event, and the like. It should be noted that sensors 102–106 may be any combination of wired or wireless sensors, that communications paths 112–116 may carry either analog or digital signals, and that network 108 may comprise any combination of sub-networks, such as, by way of example and not limitation: a telephone network; the internet; a private computer network; a wireless network, or even a collection of dedicated wires routed to the sensor array.

In a military environment it may be preferable that sensors 102–106 are man-wearable and thus, wireless. In such a system, the host computer 110 and display devices 120 would likely be carried by a squad leader. In such as a system, other ancillary systems may use data collected by the system and reported in real time, or near real time, to higher levels or command centers.

As will be appreciated by those skilled in the art, information about a detected acoustic event is typically output to a person of interest, such as a soldier who needs to return fire, through network 118 to display devices 120. When weapon 122 is fired, the muzzle blast reaches sensors 102–106 at different times based on the speed of sound and the distance of each sensor from the shooter. Whether the acoustic information is processed at the sensor, or at computer 110, a time of arrival is determined for each sensor and the differences of the various times of arrival are processed to determine a location of the source of the gunshot. In response to the gunshot, information is provided at device 120. If one or more sensors are portable or relocatable, the position of the sensor is sent to computer 110 along with time of arrival information.

Figure 2:
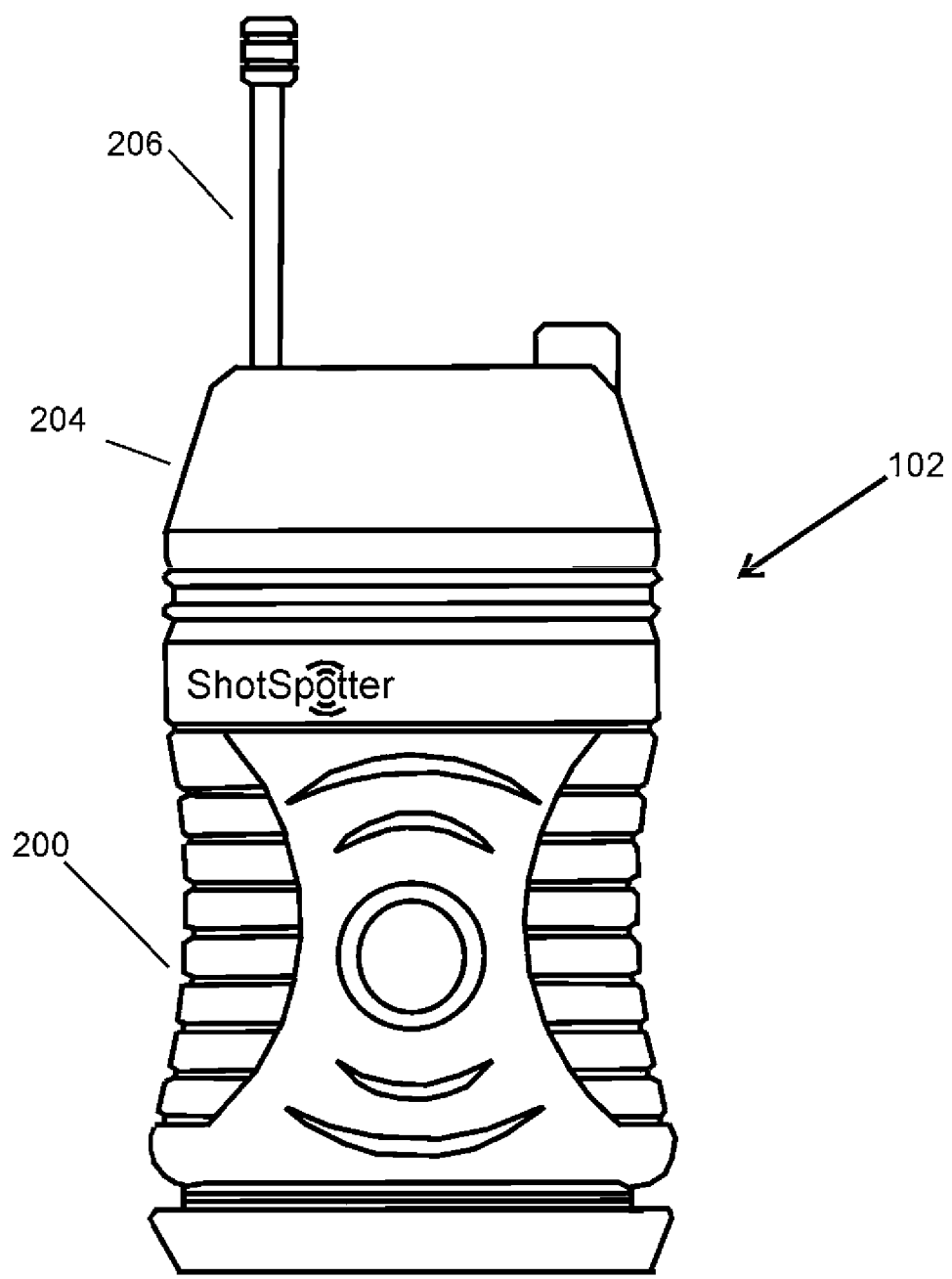
FIG. 2 provides a front view of a preferred embodiment of a sensor as employed in the inventive system.

A preferred embodiment of a man-wearable sensor 102 is shown in FIG. 2. Typically sensor 102 includes a housing 200, a support (not shown) for mounting sensor 102, and a windscreen 204 for protecting internal elements from the environment, while allowing acoustic waves to pass through to the interior. Antenna 206 is provided for radio frequency communication.

Figure 3:
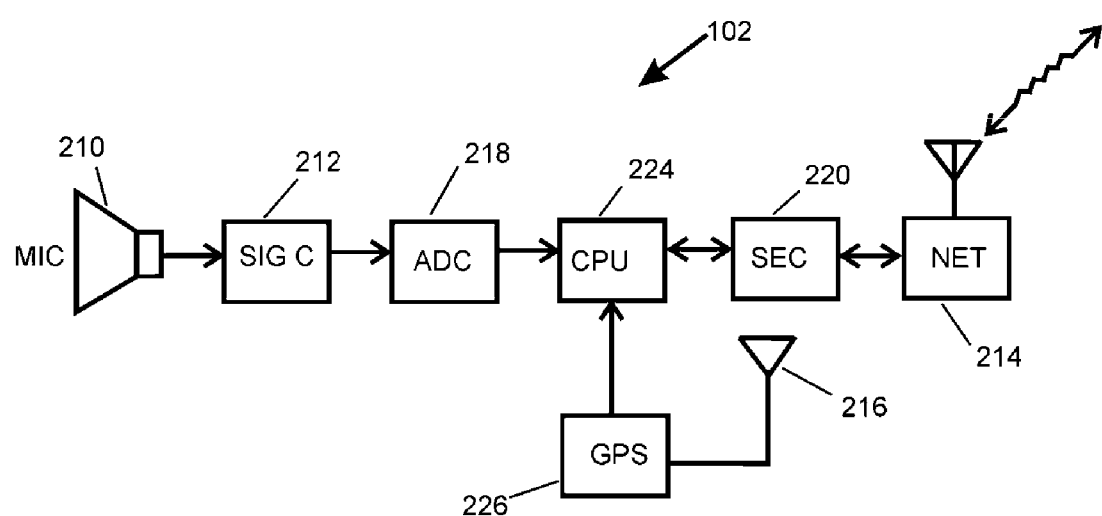
FIG. 3 provides a block diagram of a preferred embodiment of the sensor.

With reference to FIG. 3, a preferred embodiment of a wireless sensor 102 includes: a microphone 210 for receiving acoustic information; an amplifier and/or other signal conditioning 212; a processor 224, typically a digital signal processor ("DSP"), as are well known in the art; a satellite positioning receiver, e.g. a GPS 226 and GPS antenna 216; and an interface 214 for communication via a communication network. It should be noted that in such a sensor, GPS receiver 226 may play two roles, providing positional information as to the sensor's location and an exceptionally accurate real time clock for use in calculating a time of arrival for acoustic events. In one preferred embodiment, DSP 224 includes an analog-to-digital converter 218 to digitize the audio signal for processing to detect a gunshot and determine the time of arrival of the gunshot. A sensor suitable for use with the present invention is described in co-pending U.S. patent application Ser. No. 10/248,511 by Patterson, et al., filed Jan. 24, 2003, which is incorporated by reference hereinabove.

Sensor 102 also includes a security function 220 which provides encryption and/or transmission control to reduce RF visibility to an enemy and to prevent soldier or vehicle positions from falling into the wrong hands. As will become apparent to those skilled in the art from the discussion hereinbelow, security function 220 may be incorporated in software, hardware, or, more likely, some combination of software and hardware. Preferably, security module 220 will both encrypt outgoing data and decipher incoming data.

As will appreciated by those skilled in the art, if sensor 102 is man wearable, whether for military or law enforcement applications, size and weight are important considerations. In turn, electrical power consumption is likewise of prime concern since it has a direct impact on the size and weight of batteries required to operate sensor 102.

In practice a gunshot is received by microphone 210 at three or more sensors 102. At each sensor 102 the received audio is amplified by amplifier 212, digitized through A/D converter 218, and processed in processor 224 to determine if the sound is indeed a gunshot. If so, a time of arrival of the event is determined based on GPS time from GPS 226. A position is then retrieved from GPS 226, encrypted in security module 220, and transmitted along with the time or arrival via interface 214 to the host 110 (FIG. 1). At the host 110 the encrypted data is first deciphered in a security module 111, typically identical to security module 220, before positions of the sensors and differences in the times of arrivals from the reporting sensors are used to calculate the source location of the gunshot.

As will be appreciated by those skilled in the art, since each soldier-worn sensor has a GPS and the capacity to forward information to the squad leader, occasional transmission of the sensor position will allow a squad leader to keep track of the members of his squad, even when visual contact is not possible. Further, if the squad leader has communications through a chain of command, each level of command will have accurate positions for soldiers under its command.

While having such information available to the squad leader, and others, may be desirable, having the information fall into the wrong hands could be catastrophic. Further, as is also the case with other radio frequency transmissions during a conflict, allowing an enemy to detect and direction find on the transmissions from a sensor or squad leader are also undesirable.

To avoid unwanted reception of positional information, at least the positional information is encrypted. In a preferred embodiment all of the data is encrypted and a second level of encryption is performed on the sensor positions. Many data encryption schemes exist and are well known in the art. As such, an in-depth discussion regarding specific approaches is not warranted. Within military fields, only a few data security systems have gained acceptance. For purposes of this disclosure, the terms "cryptographic modules" and "authentication modules," as well as the term "encryption" should be broadly construed to include any respective data security protocols such as, by way of example and not limitation, SHA-1, shared key, RC-4, Wi-Fi protected access (WPA), 802.11i solutions, WEP, Extensible Authentication Protocol (EAP), temporal key protocol (TKIP), advanced encryption standard (AES), VPN tunneling, LEAP protocol, and the like. Such schemes perform independent of the physical network layer and are thus suitable for wired, wireless, infrared, microwave, radio frequency, as well as other type of links, whether networked or point-to-point.

The Federal Information Processing Standards, Security Requirements for Cryptographic Modules (FIPS 140) was established to provide assurance that encryption products deployed in U.S. government applications perform properly and provide appropriate levels of data protection. FIPS 140 and its progeny (e.g. FIPS 140-1, FIPS, 140-2, etc.) are hereby incorporated herein by reference. The use of FIPS enabled equipment is well known and its integration into a gunshot detection system can be accomplished by one of ordinary skill in the art, with the benefit of the disclosure contained herein. It is envisioned that, in the preferred embodiment, at least one level of encryption is in conformance with FIPS 140, or current equivalent.

It should be noted that FIPS 140 may be accomplished in software within DSP 224 or dedicated encryption hardware may be inserted between DSP 224 and communication interface 224.

It should also be noted that when 802.11b or 802.11g is employed, WAP or WEP may be performed within the interface subsystem, transparent to other hardware and software.

It should also be noted that the inventive system is particularly well suited to encryption because latency from the process of encrypting does not effect operation of the system.

As mentioned hereinabove, another issue impacting security of the system is the predictability with which radio transmission occur. The inventive system is well suited for techniques such as jitter and stagger which are well known in the art, particularly with regard to radar systems. Further there is no need for truly periodic transmissions and thus, administrative transmission can occur on a random basis. In a method for reducing the radio frequency visibility of the sensor, upon a transmission of administrative information, a random period of time between a lower limit and an upper limit is determined and used to schedule a subsequent administrative transmission. Alternatively, the host processor can poll for information and the randomization can occur in the host processor. The goal being to wait a time period which is not readily predictable between administrative transmissions whether determined by randomization, jitter, stagger, and/or host polling.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the scope and spirit of this invention.

What is claimed is:

1. A gunshot detection system comprising:
a plurality of acoustic sensors, each sensor including:
a microphone for receiving acoustic information;
a processor in communication with said microphone for processing said acoustic information to detect an acoustic event and determine a time of arrival of said acoustic event;
a GPS receiver for providing a first position of said each sensor;
a first encryption module for encrypting said first position to create a secure position; and
a network interface for transmitting said secure position and said time of arrival; and
a host processor including:
a network interface for receiving said secure position and said time of arrival;
a second encryption module for deciphering said secure position to restore said first position;
a processor for determining a source location of said acoustic event from information collected from said plurality of sensors.

2. The gunshot detection system of claim 1 wherein said time of arrival is encrypted by said first encryption module and deciphered by said second encryption module.

3. The gunshot detection system of claim 2 wherein said secure position is encrypted by said first encryption module and deciphered by said second encryption module.

* * * * *